W. W. BURNS.
PISTON AND PISTON RING.
APPLICATION FILED DEC. 1, 1920.

1,419,813.

Patented June 13, 1922.

Inventor
Walter W. Burns

UNITED STATES PATENT OFFICE.

WALTER W. BURNS, OF GREENPORT, NEW YORK, ASSIGNOR TO HARRY B. JOHNSTON, OF SEATTLE, WASHINGTON.

PISTON AND PISTON RING.

1,419,813.     Specification of Letters Patent.     Patented June 13, 1922.

Application filed December 1, 1920. Serial No. 427,603.

*To all whom it may concern:*

Be it known that I, WALTER W. BURNS, residing at Greenport, county of Suffolk, State of New York, a citizen of the United States, have invented certain new and useful Improvements in Pistons and Piston Rings, of which the following is a specification.

This invention relates to pistons and piston rings and has for one of its objects the provision of an improved ring construction wherein the greater the pressure placed upon the piston, as from the combustion chamber in an internal combustion motor, the greater will be the pressure of the ring outwardly against the wall of the cylinder.

Another object of the invention is the provision of a multi-section ring wherein one of the ring-sections receiving pressure from the chamber adjacent the piston head will cause another ring section to be forced outwardly against the wall of the cylinder.

Another and further object of this invention is the provision of a piston and ring construction wherein a two-section ring is provided and wherein no plane surfaces are provided which through their contact with each other must prevent the passage of the fluid in order to insure the perfect operation of the piston and ring.

I have found that in a piston and ring construction, where it is desired to make a tight seal between surfaces of a piston and ring, a conical surface bearing against a conical surface of similar inclination or a cylindrical surface bearing against a cylindrical surface of similar diameter, will cause a better fit and therefore a better seal, than is produced when a flat surface is pressed against another flat surface in a similar place in such a construction. This is found to be particularly true in the case of the gasoline engine, wherein the hot gases have to be held in the combustion chamber without leakage, in order to insure the efficient operation of the engine.

Referring particularly to the drawing wherein preferred embodiments of my invention are illustrated—

Figure 1:
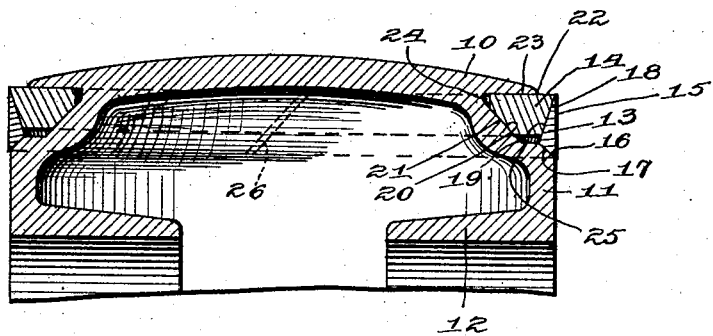
Figure 1 represents a cross section of a piston and ring construction illustrating my invention.

Referring particularly to Fig. 1, 10 designates the head of a piston, 11 the side thereof, and 12 bosses which may be provided for the wrist pin. Adjacent the end of the piston is provided a groove, within the groove is illustrated a piston ring having sections 13 and 14. The section 13 has an angular cross section, its outer surface 15 contacting with the cylinder of the engine when installed therein. Its lower surface 16 is of conical shape and contacts with a similarly shaped surface 17 on the piston and in the groove. Its inner surface 18 is of conical shape and contacts with a similarly shaped surface 19 of the ring section 14. The ring section 14 has a lower inner surface 20 which is conical in shape and which contacts with a similarly shaped surface 21 of the groove of the piston. The head 10 of the piston is preferably cut away at 22 to expose a portion of the upper surface 23 of the ring section 14 to the action of the pressure at the end of the piston. At the rear of the ring section 14 is preferably provided a carbon space 24 and below the ring section 14, as illustrated, is preferably a carbon space 25. The upper surface 23 of the ring section 14 is here illustrated as being in a plane. As applied to an internal combustion engine when the pressure from the explosion strikes the exposed surface of the ring section 14, this ring section is forced downwardly between the surface 18 of the ring section 13 and the surface 21 of the groove. This action causes the ring section 13 to be forced downwardly and outwardly, it being confined between the surface 19 of the ring section 14, the surface of the cylinder wall and the conical surface 17 of the groove. This action of forcing the ring section 13 outwardly against the wall of the cylinder causes a tight seal to be made between the cylinder and the piston, there being a conical surface 17 and a cylindrical surface with which the surface 15 contacts.

Figure 2:
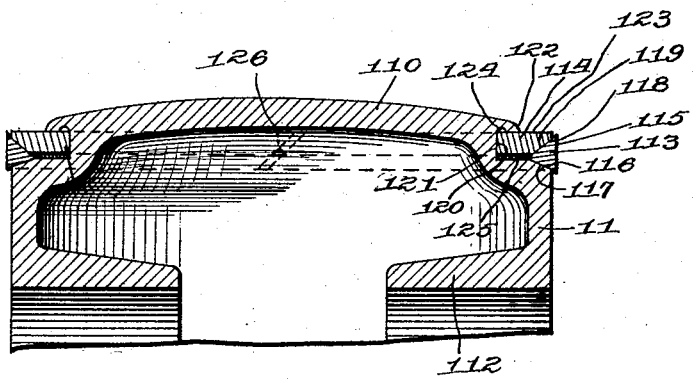
Fig. 2 illustrates a modification showing the parts in different proportions and the arrangement slightly different.

Referring now particularly to Fig. 2, 110 designates the piston head, 111 the side of the piston, and 112 bosses which may be provided to receive the wrist pin connection. Ring sections 113 and 114 are provided in a groove near the end of the piston. The outer surface 115 of the ring section 113 contacts with the wall of the cylinder when installed therein. A lower surface 116 of the ring section 113 is of conical shape and is in contact with a similarly shaped surface 117 of the piston groove. The inner surface 118 of the ring section 113 is of conical form and is in contact with a similarly shaped surface 119 of the ring section 114. The inner surface 120 of the ring section 114 is of cylindrical shape and contacts with a similarly shaped surface 121 of the groove. The head 110 of the piston is cut away, as at 122, to expose a portion of the upper surface 123 of the ring section 114 which is here illustrated as being in a plane.

A carbon space 124 is provided in the piston groove at the juncture of the surface 121 and 123 and another carbon space 125 is provided below the ring section 114.

When the pressure at the end of the piston, as from the explosion in an internal combustion motor, reaches the surface 123, the ring section 114 is forced downwardly. This ring section passing downwardly between the surfaces 118 of the ring section 113 and the surface 121 of the groove causes the ring section 113 to be forced downwardly and along the surface 117 of the groove. This action causes a tight seal between the surface 115 and the wall of the cylinder. The surface 117 being of conical form and the surface 115 being of cylindrical form and being in contact with similar surfaces respectively, a tight seal is maintained between the piston and the cylinder in which it operates.

These ring sections are provided with suitable splits as are illustrated diagrammatically at 26 and 126, respectively. Since the particular form of these splits forms no part of the invention described in this case it is not thought to be necessary to illustrate the split more in detail.

It will thus be seen that I have provided a two-section ring wherein one section is used to receive a pressure from the end of the cylinder and the other section of the ring causes the tight seal to be made between the piston and cylinder.

With this construction it will be apparent that the greater the pressure above the piston head the greater will be the pressure of the outer ring section against the wall of the cylinder and by like reasoning the less the pressure from above, the less will be the pressure outwardly against the wall of the cylinder. In this way the friction between the ring and the cylinder is reduced to a minimum, since no initial outward spring tension is necessary more than to hold the ring is position against the wall.

The advantage of this construction is that the oil film between the ring and the cylinder is held therebetween and is not blown out by the pressure of the fluid at the end of the piston. This is a distinct advantage since when the oil film is removed as is the case in the ordinary rectangular ring when it meets high pressure, the metal of the ring is permitted to come in contact with the metal of the cylinder. This action causes friction and a wearing away of the surfaces of the ring and cylinder. Due to the turning of the crank on one side, the piston is forced against the cylinder on the opposite side. Should the oil film be removed wear takes place along this side where the pressure is great between the piston and the cylinder wall and the cylinder is caused to wear out of round.

In the preferred form the faces 15 and 115 are less in width respectively relative to the width of the surfaces 22 and 122.

The angles of the various contacting surfaces may be varied, thereby varying the pressure of the respective ring sections 13 and 113 against the cylinder.

While I have described preferred embodiments of my invention in detail I desire to have it understood that I do not limit myself to the exact construction illustrated and that other modifications and changes may be made without departing from the spirit of the invention and within the scope of the appended claims.

What I claim is:

1. In combination, a piston having a groove and a piston ring in the groove, the groove having an inclined wall, the ring having a plurality of sections, one of the ring sections having an outer surface for engaging a cylinder and oppositely disposed outwardly diverging conical surfaces, one of which contacts with the inclined wall of the groove, another ring section having upwardly diverging surfaces, one of which is conical and similar in angularity to, and cooperating with, one of the conical surfaces of the first mentioned ring section, the other being in contact with a wall of the groove, the second section having a surface, between the diverging surfaces, which is exposed to the pressure at the end of the piston.

2. In combination, a piston having a groove adjacent its end and a piston ring in the groove, the groove having an inclined wall inclined outwardly and away from the adjacent end of the piston, the ring having a plurality of sections, one of the ring sections having an outer surface for engaging a cylinder and oppositely disposed outwardly diverging conical surfaces, one of which engages the inclined wall of the groove, the conical surfaces inclining in opposite directions relative to the plane of the ring section, another ring section having a conical surface similar in angularity to, and cooperating with, one of the conical surfaces of the first mentioned ring section.

3. In combination, a piston having a groove adjacent its end and a piston ring in the groove, the groove having an inclined wall, the ring having a plurality of sections, one of the ring sections having an outer surface for engaging a cylinder and oppositely disposed outwardly diverging conical surfaces, one of which is similar in inclination to and cooperates with the inclined wall of the groove, another ring section having two conical surfaces, one of which contacts with a rear groove wall and one of which is similar in angularity to, and cooperates with the other conical surface of the first mentioned ring section.

4. In combination, a piston having a groove adjacent its end and a piston ring in the groove, the groove having a wall inclined outwardly and away from the adjacent end of the piston, the ring having a plurality of sections, one of the ring sections having an outer surface for engaging a cylinder and oppositely disposed outwardly diverging conical surfaces, one of which contacts with the inclined wall of the groove, the conical surfaces inclining in opposite directions relative to the plane of the ring section, another ring section having two conical surfaces, one of which is similar in angularity and cooperates with, the conical surface on the first ring section which is opposite to the conical surface contacting with the wall of the groove.

5. In combination, a piston having a groove adjacent its end and a piston ring in the groove, the ring having a plurality of sections, the groove having surfaces for contact with a plurality of the sections, one of which contact surfaces is of conical shape, one of the ring sections having an outer surface for engaging a cylinder, a conical surface for engaging the conical surface of the groove, another ring section having converging surfaces, one of which surfaces is shaped correspondingly to one of the surfaces of the first mentioned section and in contact therewith, the other of which engages a rear wall of the groove, the second mentioned section having a surface exposed to the pressure at the end of the piston.

6. In combination, a piston having a groove adjacent its end and a piston ring in the groove, the ring having a plurality of sections, the groove having two portions of its walls of conical shape for the contact of similar surfaces of the ring sections, one of the ring sections having an outer surface for engaging a cylinder, a conical surface for engaging one of the conical portions of the wall of the groove, another ring section having a conical surface engaging another conical portion at the rear of the groove, the two ring sections having adjacent surfaces which contact and cooperate with each other.

7. In combination, a piston having a groove adjacent its end and a piston ring in the groove, the ring having a plurality of sections, the groove having bearing surfaces for a plurality of the ring sections, the bearing surface for an inner section being of conical shape, one of the ring sections having an outer surface for engaging a cylinder and having two inwardly converging surfaces, one of which engages a bearing surface in the groove, another section having inner and outer converging surfaces, the inner surface being of conical shape and engaging the conical surface of the groove, the outer surface being in contact with one of the converging surfaces of the first mentioned ring section.

8. In combination, a piston having a groove and having a cut away portion between the groove and its end and a piston ring in the groove, the groove having an inclined wall, the ring having a plurality of sections, one of the ring sections having an outer surface for engaging a cylinder and oppositely disposed outwardly diverging conical surfaces, one of which contacts with the inclined wall of the groove, another ring section having a conical surface similar in angularity to, and cooperating with, one of the conical surfaces of the first mentioned ring section, the second section having one of its surfaces engaging a rear wall of the groove.

9. In combination, a piston having a groove adjacent its end, a portion between the groove and piston end being cut away, and a piston ring in the groove, the ring having a plurality of sections, the groove having surfaces positioned for cooperation with a plurality of the ring sections during the sealing operation of the ring, one of which contact surfaces being of conical shape, one of the ring sections having an outer surface for engaging a cylinder, a conical surface for engaging the conical surface of the groove, another ring section having converging surfaces, one of which surfaces is shaped correspondingly to one of the surfaces of the first mentioned section and in contact therewith, the other converging surface contacting with the other contacting surface of the groove.

10. A piston having a groove adjacent its end, the end adjacent the groove being cut away, the groove having two conical ring bearing surfaces on the same side of the groove.

In testimony whereof I hereunto affix my signature.

WALTER W. BURNS.